United States Patent
Okada

(10) Patent No.: US 9,681,010 B2
(45) Date of Patent: Jun. 13, 2017

(54) PRINTING APPARATUS FOR CONTROLLING DISCHARGE TO FIRST STACKING UNIT ACCORDING TO STATUS OF FIRST STACKING UNIT AND SECOND STACKING UNIT

(71) Applicant: CANON KABUSHIKI KAISHA, Tokyo (JP)

(72) Inventor: Hideyuki Okada, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/824,628

(22) Filed: Aug. 12, 2015

(65) Prior Publication Data

US 2016/0052310 A1    Feb. 25, 2016

(30) Foreign Application Priority Data

Aug. 20, 2014   (JP) ................. 2014-167955

(51) Int. Cl.
| | |
|---|---|
| H04N 1/00 | (2006.01) |
| B41J 13/00 | (2006.01) |
| B41J 13/10 | (2006.01) |

(52) U.S. Cl.
CPC ...... *H04N 1/00466* (2013.01); *B41J 13/0036* (2013.01); *B41J 13/106* (2013.01); *H04N 1/0032* (2013.01); *H04N 2201/0094* (2013.01)

(58) Field of Classification Search
CPC .............. H04N 1/00466; H04N 1/0032; B41J 13/0036; B41J 13/106
See application file for complete search history.

(56) References Cited

U.S. PATENT DOCUMENTS

| | | | | |
|---|---|---|---|---|
| 8,985,580 | B2* | 3/2015 | Ozaki ................ | G03G 15/6547 271/279 |
| 2004/0096234 | A1* | 5/2004 | Kurahashi .......... | G03G 15/6538 399/82 |
| 2007/0019224 | A1* | 1/2007 | Okada .................. | G06F 3/1208 358/1.13 |
| 2007/0057445 | A1* | 3/2007 | Miyake .................... | B65H 7/06 271/256 |
| 2010/0091323 | A1* | 4/2010 | Sunada .................. | B41J 13/106 358/1.15 |
| 2012/0019857 | A1* | 1/2012 | Miyajima .......... | G03G 15/5012 358/1.15 |
| 2013/0322946 | A1* | 12/2013 | Okada .................... | B41J 13/106 400/582 |
| 2014/0153937 | A1* | 6/2014 | Unno ..................... | G03G 15/70 399/21 |

(Continued)

FOREIGN PATENT DOCUMENTS

JP    2010-143734 A    7/2010

*Primary Examiner* — Benjamin O Dulaney
(74) *Attorney, Agent, or Firm* — Carter, DeLuca, Farrell & Schmidt, LLP

(57) ABSTRACT

A printing apparatus has a stacker that includes a first stacking unit that stacks discharged sheets and a second stacking unit that slides a predetermined amount of sheets stacked on the first stacking unit from the first stacking unit and holds them. In a case in which a print job is executed, an operation of discharging sheets to the first stacking unit is controlled according to stacking statuses of the first stacking unit and the second stacking unit.

14 Claims, 10 Drawing Sheets

(56) References Cited

U.S. PATENT DOCUMENTS

| | | | |
|---|---|---|---|
| 2015/0035220 A1* | 2/2015 | Nunokawa | B65H 1/266 271/4.03 |
| 2015/0232298 A1* | 8/2015 | Yamashita | B65H 31/10 271/176 |
| 2016/0039627 A1* | 2/2016 | Maeda | B65H 31/24 271/288 |
| 2016/0044194 A1* | 2/2016 | Wakana | H04N 1/00631 358/1.12 |

\* cited by examiner

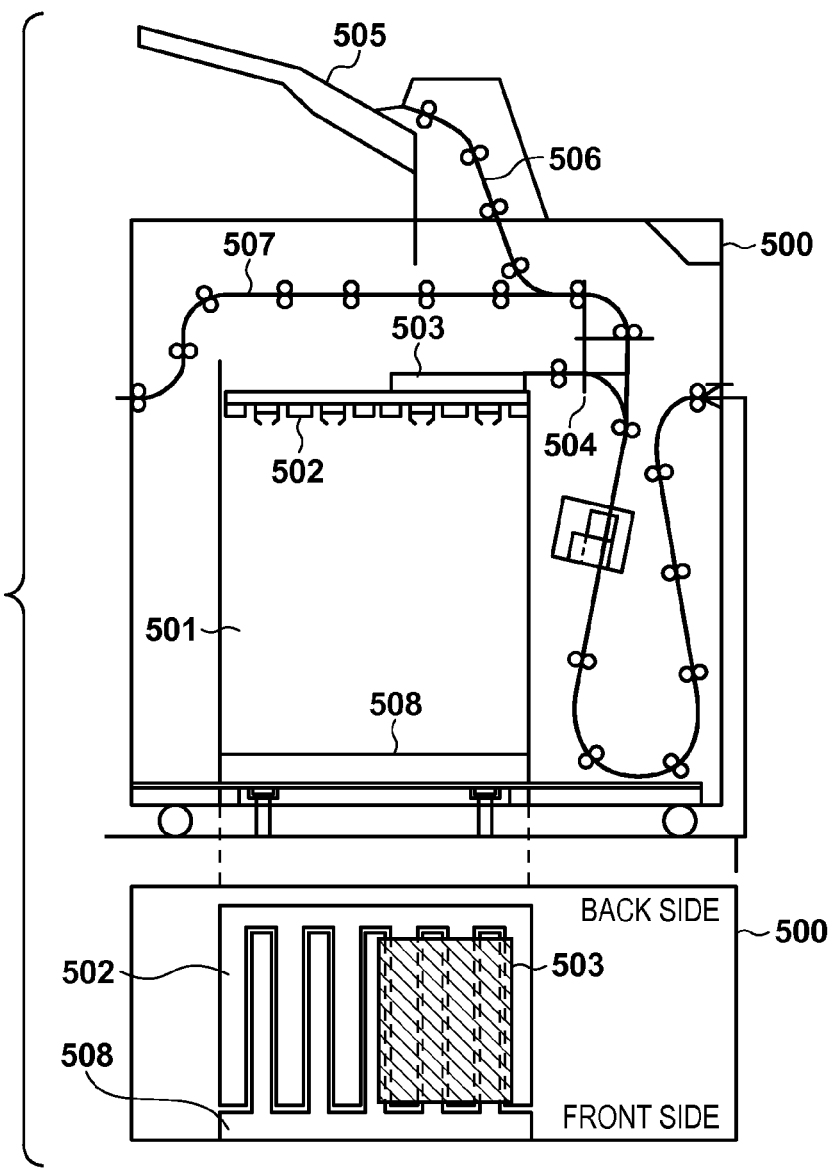
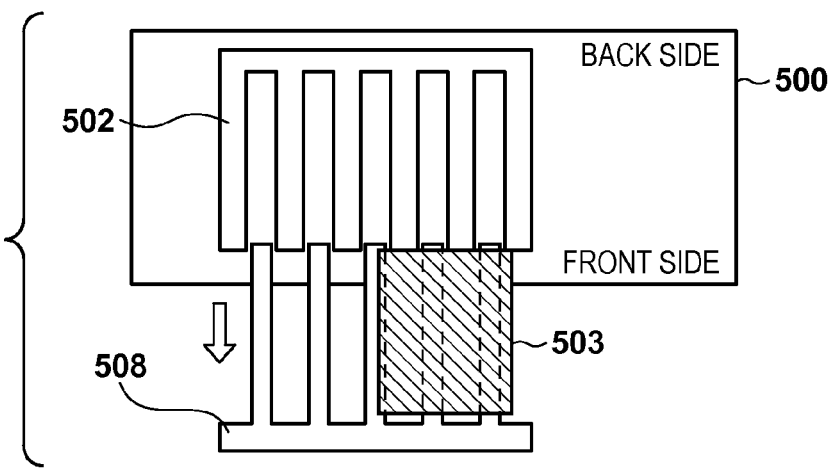
FIG. 5A
FIG. 5B

F I G. 10
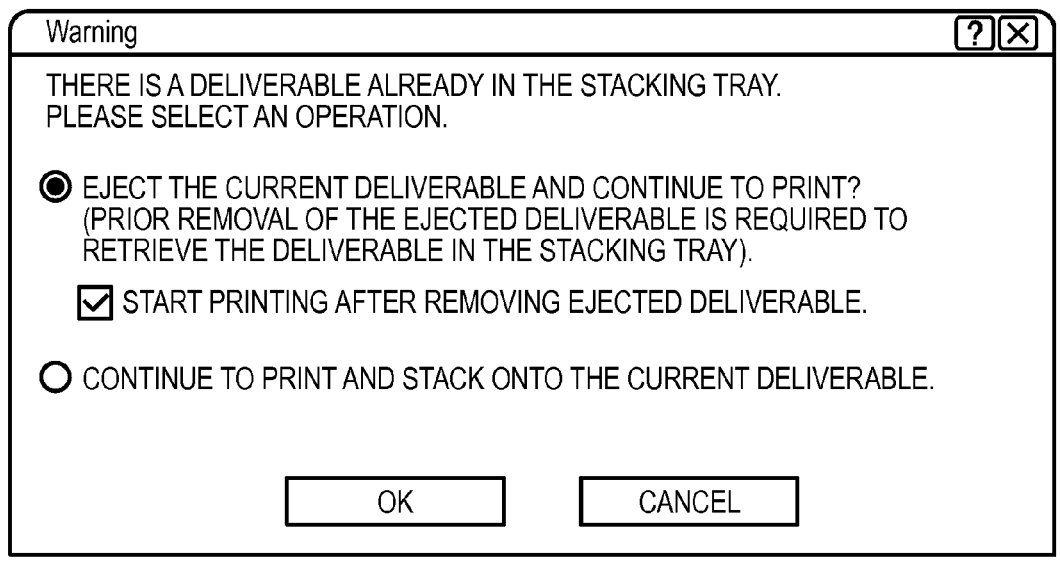

120# PRINTING APPARATUS FOR CONTROLLING DISCHARGE TO FIRST STACKING UNIT ACCORDING TO STATUS OF FIRST STACKING UNIT AND SECOND STACKING UNIT

BACKGROUND OF THE INVENTION

Field of the Invention

The present invention relates to a printing apparatus to which a stacker can be connected and a control method.

Description of the Related Art

A machine called a stacker that can stack large quantities of printed items from a finisher with favorable stackability is used in production printing that covers the printing of commercial printing deliverables. There is a stacking tray in the stacker that descends as printing deliverables are stacked, and even at the very least, several thousands of sheets of printing deliverables can be stacked thereon. Also, when a stacked deliverable is to be conveyed, there are many cases of configurations in which a deliverable can be transported using an entire stacking tray, a dedicated cart, or the like, so that there is no need for a user to manually move deliverables to the cart. Also, there is a stacker equipped with multiple stacking trays so that the space inside it is used efficiently and even more deliverables can be stacked (Japanese Patent Laid-Open No. 2010-143734). For example, by providing two stacking trays in a stacker that has a capacity in which 5000 sheets of an A3 sized deliverable can be stacked, 10,000 sheets can be stacked, which is double, if the deliverable is A4 size.

There is also a stacker that has a function in which deliverables are automatically discharged to the outside of the stacker when the amount of deliverables in the stacker has reached the permissible amount for stacking. This stacker is configured such that after deliverables have been temporarily discharged to the outside of the stacker, the stacking of deliverables inside the empty stacker can be continued automatically. Also, after the deliverables stacked inside the stacker have been temporarily discharged to the outside of the stacker, the stacking of deliverables inside the stacker is started again, and once the permissible amount has been reached again, the stacker becomes fully stacked for the first time. In other words, at this point a need arises for the first time for the user to remove the stacked deliverables in order for the printing and stacking of a deliverable to continue. In this way, the stacker that has the function in which deliverables are automatically discharged to the outside of the stacker can continuously print for extended periods of time without intervention from a user.

However, there is an interrupt print function in which one print job interrupts the middle of another print job that is being performed. This is executed when there is a change to job scheduling due to a print job request from a client, for example. With the interrupt print function, the current printing is interrupted, and a print job with a high degree of priority can be executed with priority. Also, the interruption processing at this time is not just processing in which printing is quickly stopped, but rather control is performed so as to stop the print job at a favorable break point, such as a break at the end of a deliverable set or the end of a bundle in post-processing. Accordingly, a print job can be inserted by interrupting another print job, while also performing control so as to suppress wasted deliverables as much as possible.

The aforementioned stacker, that has a function in which deliverables are automatically discharged to the outside of the stacker, is configured such that the deliverables that are stacked inside the stacker cannot be removed as long as a bundle of the deliverables discharged outside of the stacker has not been removed. Assume that a bundle of deliverables has been previously discharged to the outside of the stacker for this reason, and that sheets of another job are discharged into the stacker using the above-described interrupt print function. In this case, the bundle obtained by performing interrupt printing cannot be removed as long as the bundle of deliverables that was previously discharged to the outside of the stacker has not been removed.

SUMMARY OF THE INVENTION

An aspect of the present invention is to eliminate the above-mentioned problems with the conventional technology. The present invention provides a printing apparatus and a control method that increases user-convenience when printed goods are discharged to a stacker that has a function in which printed goods are discharged to the outside of the stacker.

The present invention in one aspect provides a printing apparatus that includes a stacker that can stack discharged sheets, the stacker including a first stacking unit that stacks discharged sheets and a second stacking unit that slides a predetermined amount of sheets stacked on the first stacking unit from the first stacking unit and holds the slid sheets, and the printing apparatus comprising a control unit configured to, in a case in which a print job is executed, control an operation of discharge to the first stacking unit according to stacking statuses of the first stacking unit and the second stacking unit.

According to the present invention, it is possible to improve user-convenience when a printed item is discharged to a stacker that has a function in which a printed item is discharged to the outside.

Further features of the present invention will become apparent from the following description of exemplary embodiments with reference to the attached drawings.

BRIEF DESCRIPTION OF THE DRAWINGS

FIGS. 5A and 5B are diagrams showing a configuration of a stacker.
FIG. 10 is a diagram showing another screen displayed when the stacker performs sheet discharge control.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same configuration elements have the same reference numbers, and redundant descriptions are omitted.

First Embodiment

Figure 1:
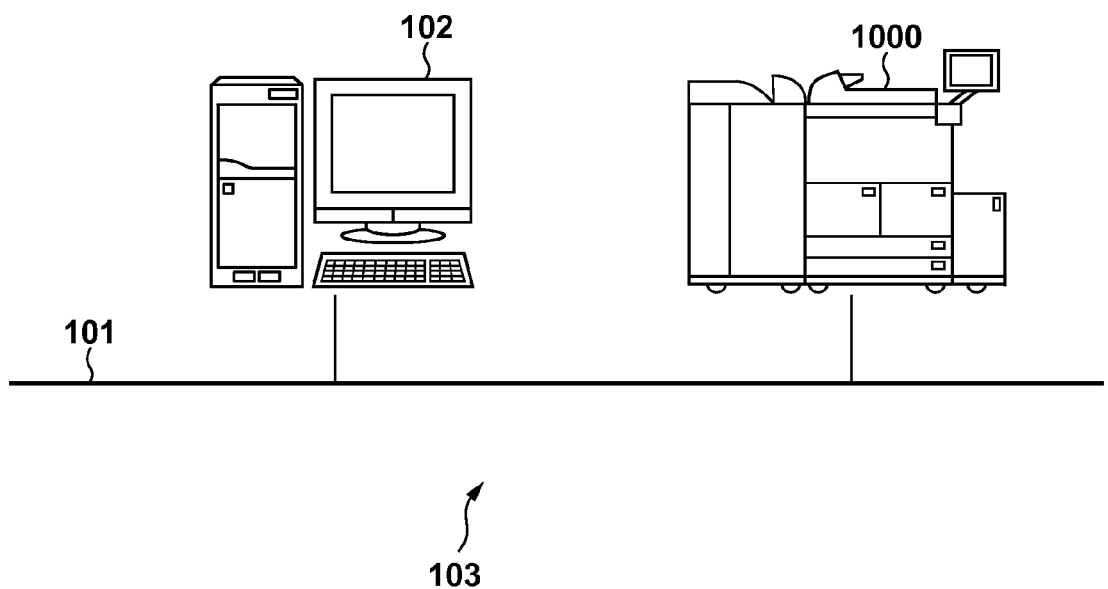
FIG. 1 is a diagram showing a configuration of a system.

Best modes for carrying out the present invention are described below using the diagrams. FIG. 1 is a diagram showing the configuration of a system. A system 103 includes a PC 102 and a printing system 1000. The PC 102 and the printing system 1000 are connected via a network 101 such as LAN in a manner in which mutual communication is possible. The PC 102 transmits a print job that is described in PDL (Page Description Language) code data and image data of a printing target to the printing system 1000 via the network 101. The printing system 1000 prints an image onto a printing medium such as a printing sheet (sheet) based on the print job and the image data.

Figure 2:
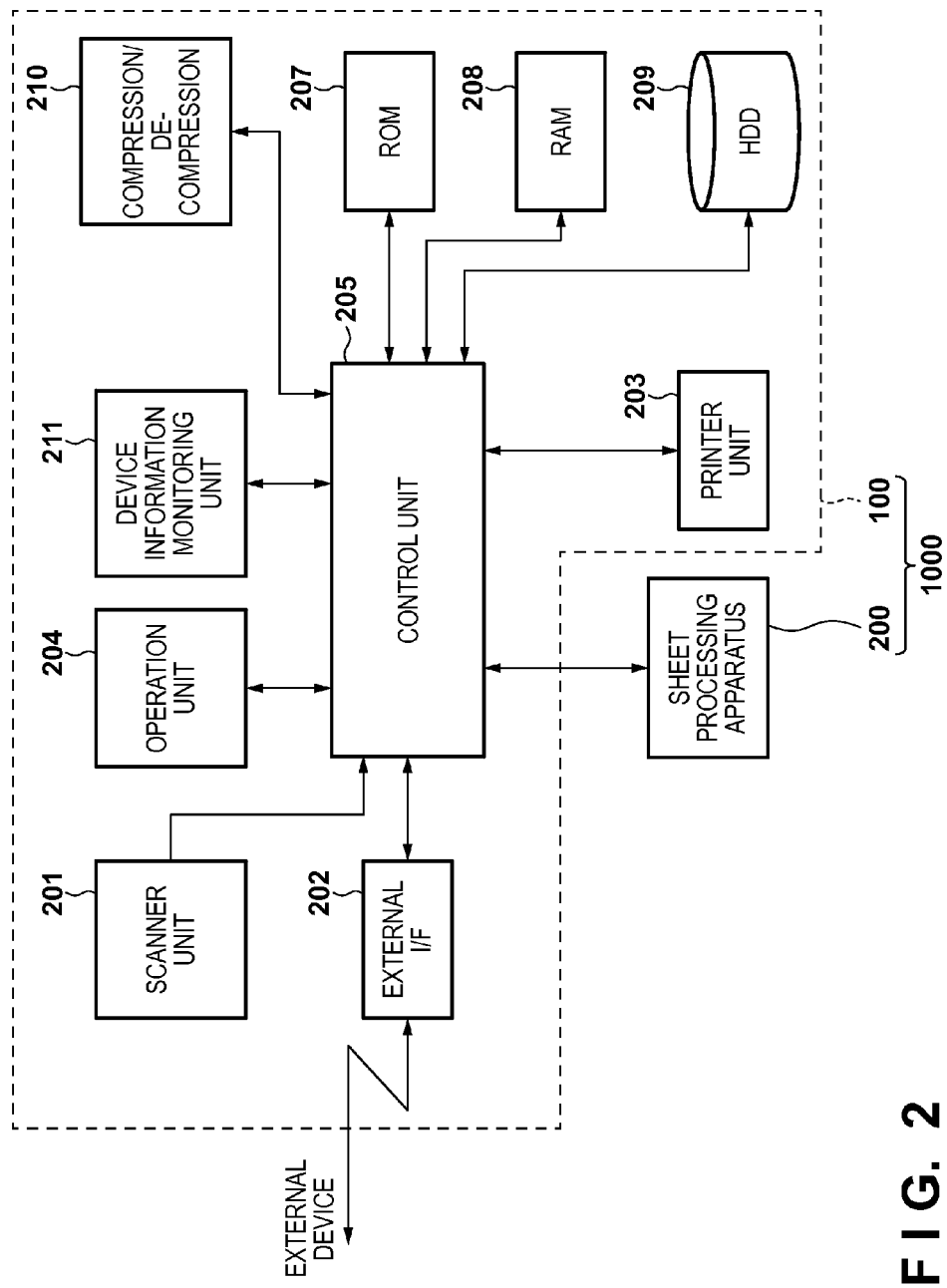
FIG. 2 is a diagram showing a configuration that includes a printing apparatus and a sheet processing apparatus.

FIG. 2 is a diagram showing the configuration of the printing system 1000. The printing system 1000 has a printing apparatus 100, which is the portion enclosed with a dashed line in the diagram, and a sheet processing apparatus 200. Note that in the present embodiment, an MFP (Multi-Functional Peripheral) that has multiple functions such as a copy function and a printer function is described as an example of the printing apparatus 100. However, the printing apparatus 100 may be a single function-type printing apparatus that only has a copy function or a printer function. The following is a description of the configuration that the printing system 1000 includes.

Figure 8:
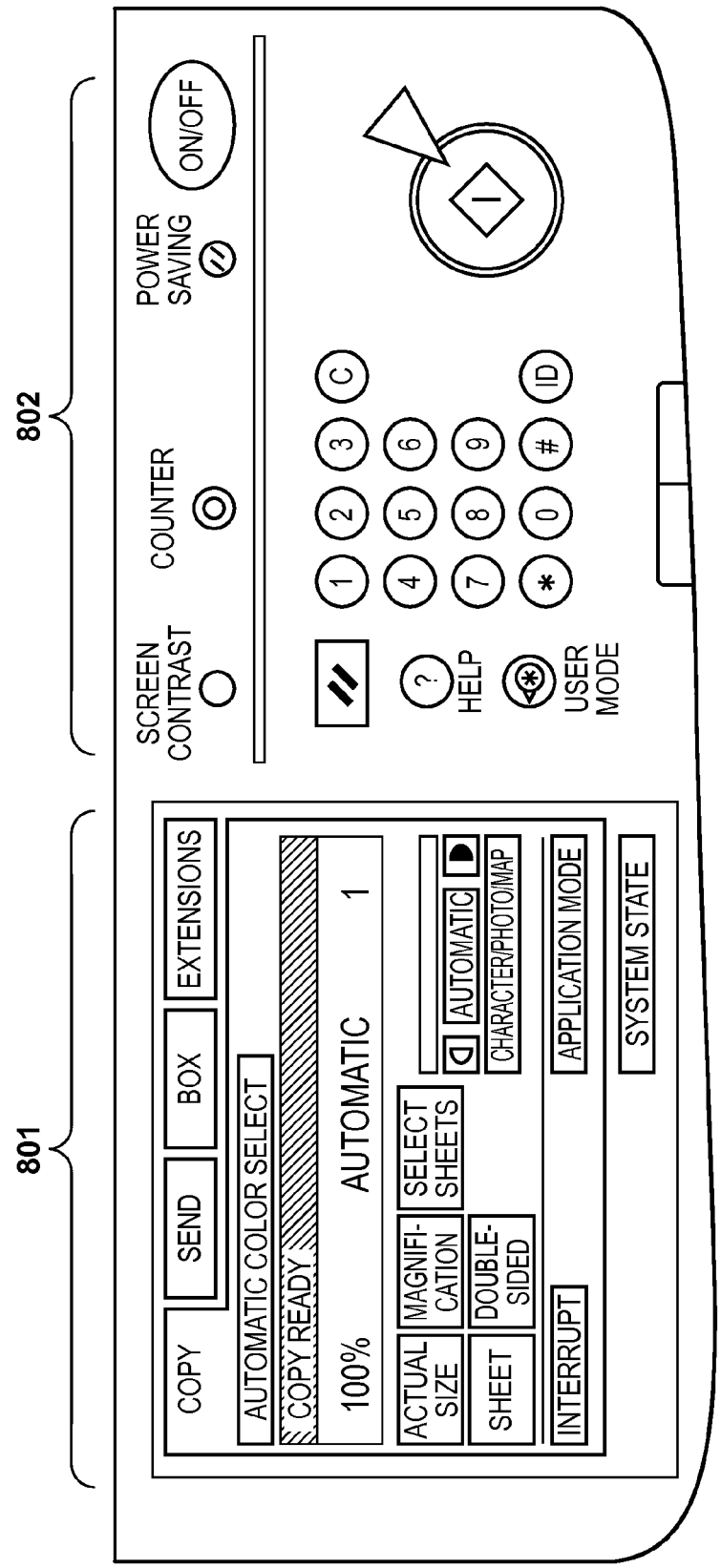
FIG. 8 is a diagram showing an operation unit.

The printing system 1000 is configured so that sheet processing of a sheet printed by the printing apparatus 100 can be executed by the sheet processing apparatus 200 that is connected to the printing apparatus 100. The sheet processing apparatus 200 is configured to be able to be connected to the printing apparatus 100, and to be able to receive instructions from the printing apparatus 100 and execute various types of sheet processing. In the present embodiment, a stacker that can perform stacking of a high volume of sheets is described as an example of the sheet processing apparatus 200. A scanner unit 201 optically reads the image on an original and converts the image into image data, which it then transfers to other units. An external interface (I/F) 202 performs the transmission and reception of data with other apparatuses that are connected to the network 101. A printer unit 203 prints the image that is based on the input image data onto a sheet. An operation unit 204 has a hard key input unit (key input unit) 802 and a touch panel unit (display unit) 801 as shown in FIG. 8. Also, the operation unit 204 receives instructions from the operator via the aforementioned units, and performs various types of display on the touch panel 801 as needed.

A control unit 205 includes a CPU or the like, and performs overall control of processing, operations, and the like of various types units of the printing system 1000. Specifically, the control unit 205 controls operations of the printing apparatus 100 and the sheet processing apparatus 200 that is connected to the printing apparatus 100. A ROM 207 stores various types of computer programs that are executed by the control unit 205. For example, the ROM 207 stores a program for causing the control unit 205 to execute various types of processes in the flowcharts that are described later, and a display control program needed to display various types of instruction reception screens that are described later. Also, the ROM 207 stores a program for executing operations in which the PDL code data received from the PC 102 is interpreted by the control unit 205, and developed into raster image data. In addition, the ROM 207 stores the boot sequence, font information, and the like. A RAM 208 stores image data and PDL code data sent from the scanner unit 201 and the external I/F 202, various types of programs loaded from the ROM 207, and setting information. Also, the RAM 208 stores information regarding the sheet processing apparatus 200 (such as information regarding the maximum number of sheets that can be stacked if the sheet processing apparatus 200 is a stacker). The control unit 205 can use information regarding the sheet processing apparatus 200 stored in the RAM 208 for control.

An HDD (Hard Disk Drive) 209 is configured by a driving unit or the like that can read and write data from and to the hard disk. The HDD 209 is a high-capacity storage apparatus for storing image data received from the scanner unit 201 that has been compressed using a compression/de-compression unit 210. The control unit 205 can print image data stored in the HDD 209 based on instructions from the operator (user) using the printer unit 203. Also, the HDD 209 is also used as a spooler, and the control unit 205 can manage the PDL code data received from the PC 102 as a job and store it to the HDD 209. Also, the control unit 205 can perform the management of jobs stored to the HDD 209, and can also obtain the number of jobs stored and setting information that has been set for a job (for example, a sheet discharge destination, printing degree of priority settings, etc.).

A device information monitoring unit 211 monitors information regarding overall constituent elements of the overall printing system 1000, including the printing apparatus 100 and the sheet processing apparatus 200. Constituent element information is, for example, status information such as the usability of the scanner unit 201 and the printer unit 203, the amount of sheets remaining and sheet settings of a paper feed tray provided in the printer unit 203, and the stacking status of a discharge tray provided in the stacker, which is the sheet processing apparatus. The control unit 205 can always obtain the above information from the device information monitoring unit 211, and is configured such that it can use the information for control. The compression/decompression unit 210 performs compression and de-compression operations on image data or the like that is stored to the RAM 208 or to the HDD 209, using various types of compression methods such as JBIG and JPEG.

Figure 4:
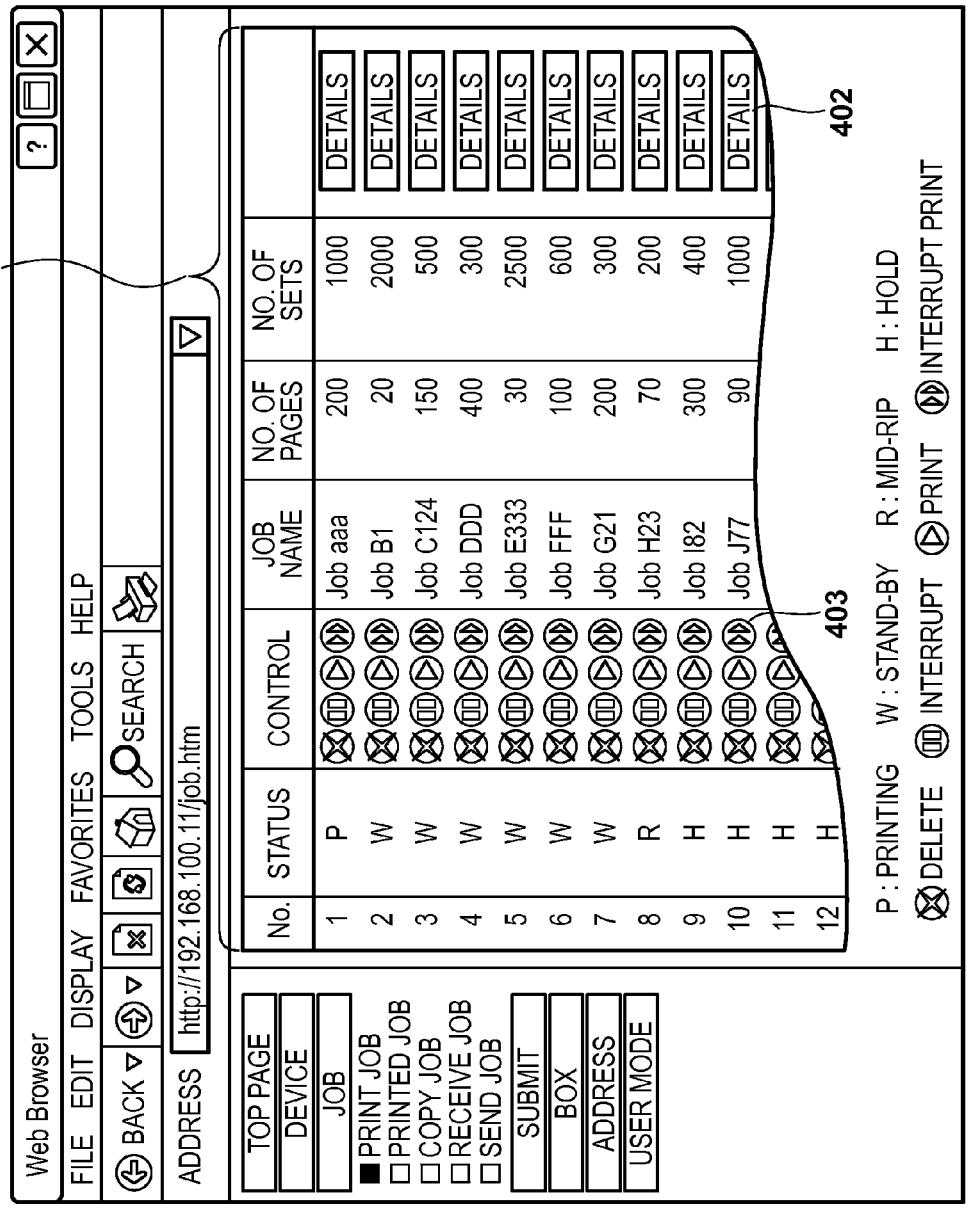
FIG. 4 is a diagram showing a print instruction screen.

In the present embodiment, a user interface that is provided in a data generation source outside of the printing system 1000 receives execution requests from the user. The data generation source is, for example, the PC 102, and the user interface is, for example, a keyboard or a pointing device that is provided in the PC 102, and a screen shown in FIG. 4. Here, FIG. 4 is a print instruction receiving screen for inputting jobs and making execution requests to the printing system 1000 via a web browser from the PC 102. A list of jobs that the printing system 1000 has received is displayed in a job list 401 of FIG. 4, and the user can check and change the advanced settings of a job by pressing a details button 402. Also, by pressing down an interrupt print button 403 that has been prepared as a control button, the user can make requests to the printing system 1000 so that the corresponding job is processed as an interruption print job. Note that the above is one example, and the present invention is not limited to this. For example, the configuration may be configured so that job execution requests are received by a user interface that is provided by the printing system 1000. In this case, for example, execution requests are received by various types of user interface screens that are configured to be interactively responsive to the software keys and the hardware keys provided in the operation unit 204 and operations by the user.

Figure 3:
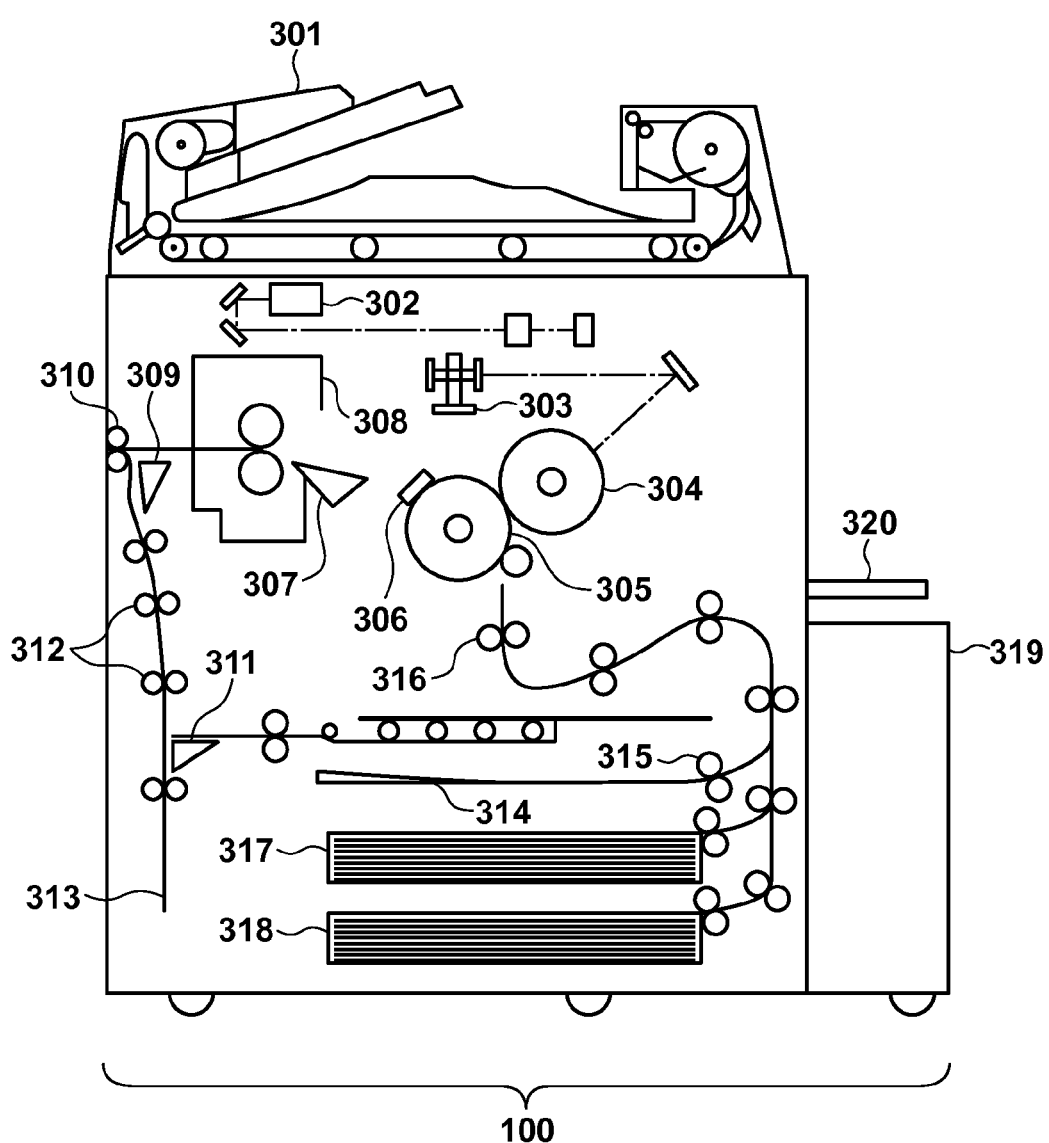
FIG. 3 is a diagram showing a configuration of the printing apparatus.

FIG. 3 is a diagram showing the configuration of the printing apparatus 100. An automatic document feeding apparatus (ADF) 301 separates originals in a bundle of originals, which has been set on a stacking surface of an original tray, in page order from the first original page, and conveys the originals onto an original mounting glass to perform original scanning using a scanner 302. The scanner 302 optically reads the image of the original that has been conveyed onto the original mounting glass, and converts the image into image data using a CCD. A light beam, such as a laser beam, that has been modulated according to the image data is incident on a rotating polygon mirror (a polygon mirror, etc.) 303, and is irradiated onto a photoconductor drum 304 as reflective scanning light via a reflective mirror. A latent image formed on the photoconductor drum 304 using the laser beam is developed using toner, and the toner image is transferred to a sheet medium affixed onto a transfer drum 305. A full color image is formed by successively executing this image formation process series for yellow (Y), magenta (M), cyan (C), and black (K) toner. After the image formation process has been performed four times, the sheet medium on the transfer drum 305 that has a full color image formed thereon is separated using a separation claw 306, and conveyed to a fixing device 308 using a pre-fixing conveyance device 307. The fixing device 308 is configured using a combination of a roller and a belt, is internally equipped with a heat source such as a halogen heater, and using heat and pressure melts and fixes the toner on the toner image transferred onto the sheet medium. A sheet discharge flapper 309 is configured to be able to swing about a swing axis, and regulates the conveyance direction of the sheet medium. When the sheet discharge flapper 309 has swung in the clockwise direction in the diagram, the sheet medium is conveyed straight ahead and discharged to the outside of the apparatus using sheet discharge rollers 310. The control unit 205 controls the printing apparatus 100 so that single-side printing is executed using the aforementioned sequence. Note that in the present embodiment, a high-capacity stacker is connected to the downstream side of the printing apparatus 100 as the sheet processing apparatus 200. In the case of such a configuration, a printing medium conveyance path is configured in which sheets that are discharged by the sheet discharge rollers 310 to the outside of the apparatus are connected to be input to the next high-capacity stacker.

However, in the case in which an image is to be formed on both surfaces of the sheet medium, the sheet discharge flapper 309 swings in the counter-clockwise direction in the diagram, and the sheet medium is changed to a downward course and fed to a double-side conveyance unit. The double-side conveyance unit includes an inverting flapper 311, inverting rollers 312, an inverting guide 313, and a double-sided tray 314. The inverting flapper 311 swings about a swing axis, and regulates the conveyance direction of the sheet medium. In the case in which a double-sided print job is to be processed, the control unit 205 performs control such that the sheet medium, of which a first side of the sheet has been printed by the printer unit 203, is sent to the inverting guide 313 via the inverting rollers 312 by swinging the inverting flapper 311 in the counter-clockwise direction in the diagram. Then, the inverting rollers 312 temporarily stop with the sheet medium in a state in which the back end of the sheet medium is being clamped by the inverting rollers 312, and then the inverting flapper 311 swings in the clockwise direction in the diagram. Also, the inverting rollers 312 rotate in the opposite direction. Accordingly, a sheet switch back is performed and the sheet medium is conveyed, and this sheet is controlled so that it is guided to the double-side tray 314 in a state in which the back end and the front end of the sheet have been switched. The sheet medium is temporarily stacked in the double-side tray 314, and thereafter the sheet medium is again fed to a registration roller 316 by paper re-feed rollers 315. The sheet medium at this time is sent with the surface that is opposite to that of the first transfer step as the side that faces the photoconductor drum. Then, a second surface image is formed on the second surface of the sheet medium in a process similar to the above-described process. An image is formed on both surfaces of the sheet medium, and after going through the fixing process the sheet is discharged from inside the printing apparatus 100 to the outside of the apparatus via the sheet discharge rollers 310.

The control unit 205 controls the printing apparatus 100 so that double-sided printing is executed using a sequence such as the sequence described above. Note that in the present embodiment, regarding the sheet after being discharged to the outside of the apparatus, the process is similar to when single-side printing is performed. In other words, a conveyance path for recording mediums is configured so that sheets that have been discharged to the outside of the apparatus by the sheet discharge rollers 310 are connected to be input to the next high-capacity stacker.

Also, the printing apparatus 100 has paper feed units that store sheets needed for print processing. The paper feed units include paper feed cassettes 317 and 318 (of which each can store 500 sheets for example), a paper feed deck 319 (that can store 5000 sheets for example), a manual feed tray 320, and the like. The paper feed cassettes 317 and 318 and the paper feed deck 319 can separately store various types of sheets with different qualities and sizes in separate paper feed units. Also, various types of sheets including special sheets such as OHP sheets can be stored in the manual feed tray 320. Paper feed rollers are provided at the paper feed cassettes 317 and 318, the paper feed deck 319, and the manual feed tray 320, and sheets are continuously fed one sheet at a time using the paper feed rollers.

Next, in the present embodiment, a stacker, which is an example of the sheet processing apparatus 200, will be described with reference to FIGS. 5A and 5B. First, a stacker 500 has a stacker unit 501 that stores sheets, and within the stacker unit 501 is a stacking tray 502 (a first stacking unit) that stacks sheets. 5000 generally large sheets and, if they are small sheets, approximately 10000 sheets can be stacked on the stacking tray 502, which is configured so that it gradually descends deliverables 503 are stacked. Sheets conveyed from upstream pass through a stack path 504, and are stacked onto the stacking tray 502. Also, the stacker 500 has a sample tray 505 to reference print samples during output. The deliverables 503 output to the stacking tray 502 of the stacker 500 cannot be immediately retrieved and checked by the user, and therefore the sample tray 505 is configured such that by performing separate output during output of the sample to the sample tray 505, the user can perform retrieval and check the printing status. Also, in the case in which deliverables cannot be stacked in the stacker unit 501 for some reason, or in the case in which a sheet jam occurs, the sample tray 505 can also be used for escape. When outputting to the sample tray 505, sheets conveyed from upstream are conveyed using a sample tray discharge path 506, and are discharged to the sample tray 505.

The stacker is configured so that sheets can also be conveyed downstream and a post-processing apparatus such as a finisher can also be connected downstream. In this case, sheets that have been conveyed from upstream are conveyed using a straight path 507, and the sheets are conveyed to the post-processing apparatus connected downstream. Also, the stacker 500 has a function in which in the case in which the stacking amount of the stacking tray 502 has reached a predetermined amount (a permissible amount) of the stacker 500, the deliverables 503 stacked in the stacking tray 502 are automatically discharged to the outside of the stacker. In this case, the deliverables 503 that are stacked in the stacking tray 502 are shifted to an eject tray 508 (a second stacking unit), and the entire eject tray slides to the outside of the stacker to discharge the deliverables 503. Also, after the deliverables 503 have been discharged to the outside of the stacker, the stacking tray 502 ascends again to the start position for the stacking of deliverables, and the stacking of deliverables is resumed.

Here, the structure and discharge operations of the stacking tray 502 and the eject tray 508 will be described with reference to FIG. 5A and FIG. 5B. FIG. 5A and FIG. 5B both show a simplified state of the stacking tray 502 and the eject tray 508 when viewed from directly above the stacker 500. As shown in the figures, the stacking tray 502 and the eject tray 508 are shaped to fit with each other, and are configured in such a way that interplay is possible. Also, the stacking tray is configured so as to be able to move vertically, and the eject tray is configured to able to move forward and backward (toward the front of the machine and the back side). Then, when the deliverables 503 that are stacked on the stacking tray 502 are to be discharged to the outside of the stacker, first, the stacking tray 502 onto which the deliverables 503 are stacked descends to a position lower than the eject tray 508. Accordingly, the deliverables 503 are held (stacked) on the eject tray 508. Thereafter, as shown in FIG. 5B, the eject tray 508 on which the deliverables 503 are stacked slides to the outside of the stacker 500 (the front side of the machine) to discharge them. Then, after the eject tray 508 has discharged the deliverable to the outside of the stacker 500, the stacking tray 502 again ascends to a start position to resume the loading of deliverables, and the loading of deliverables is resumed.

Figure 6:
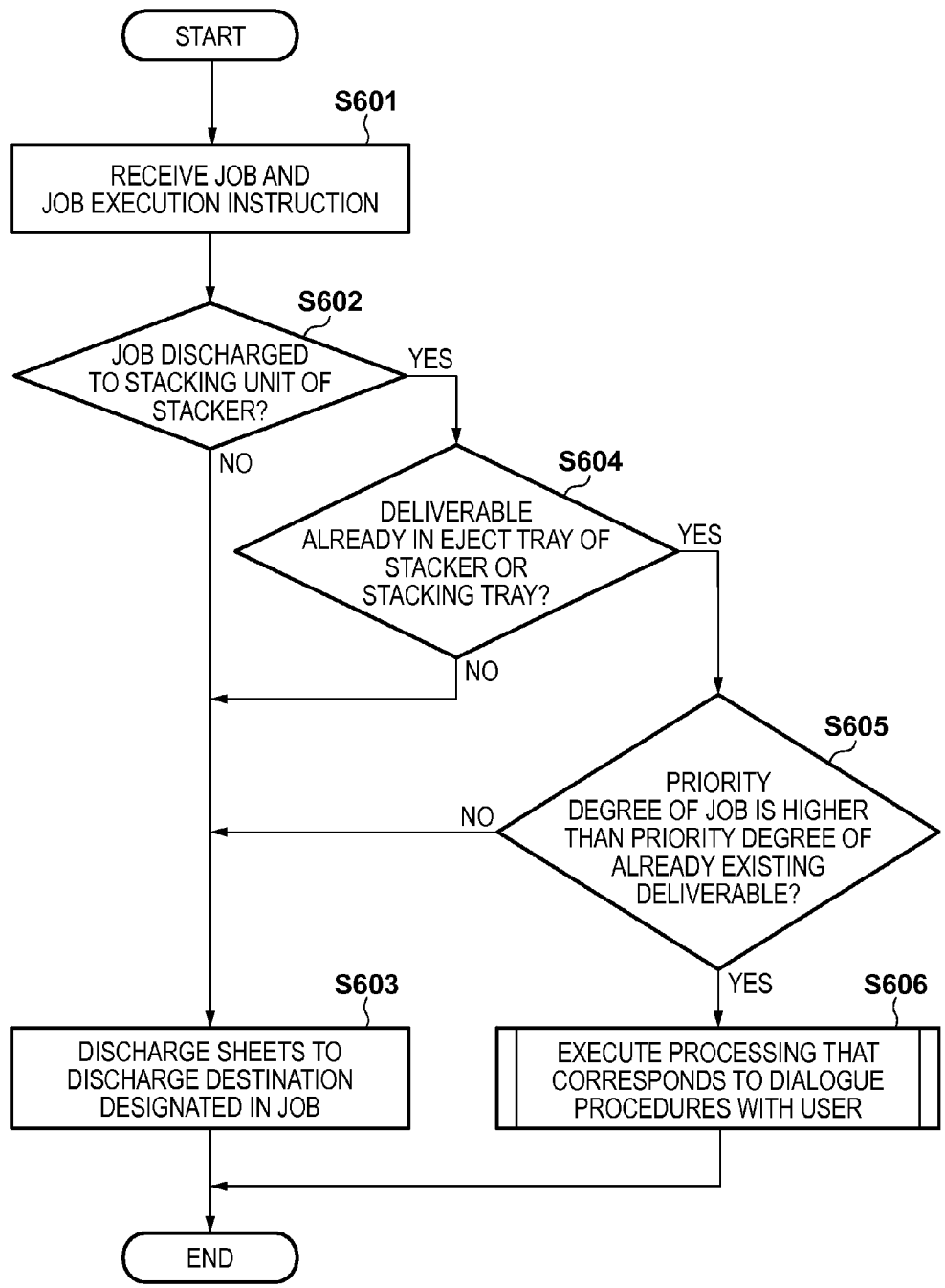
FIG. 6 is a flowchart showing stacker sheet discharge control.
Figure 7:
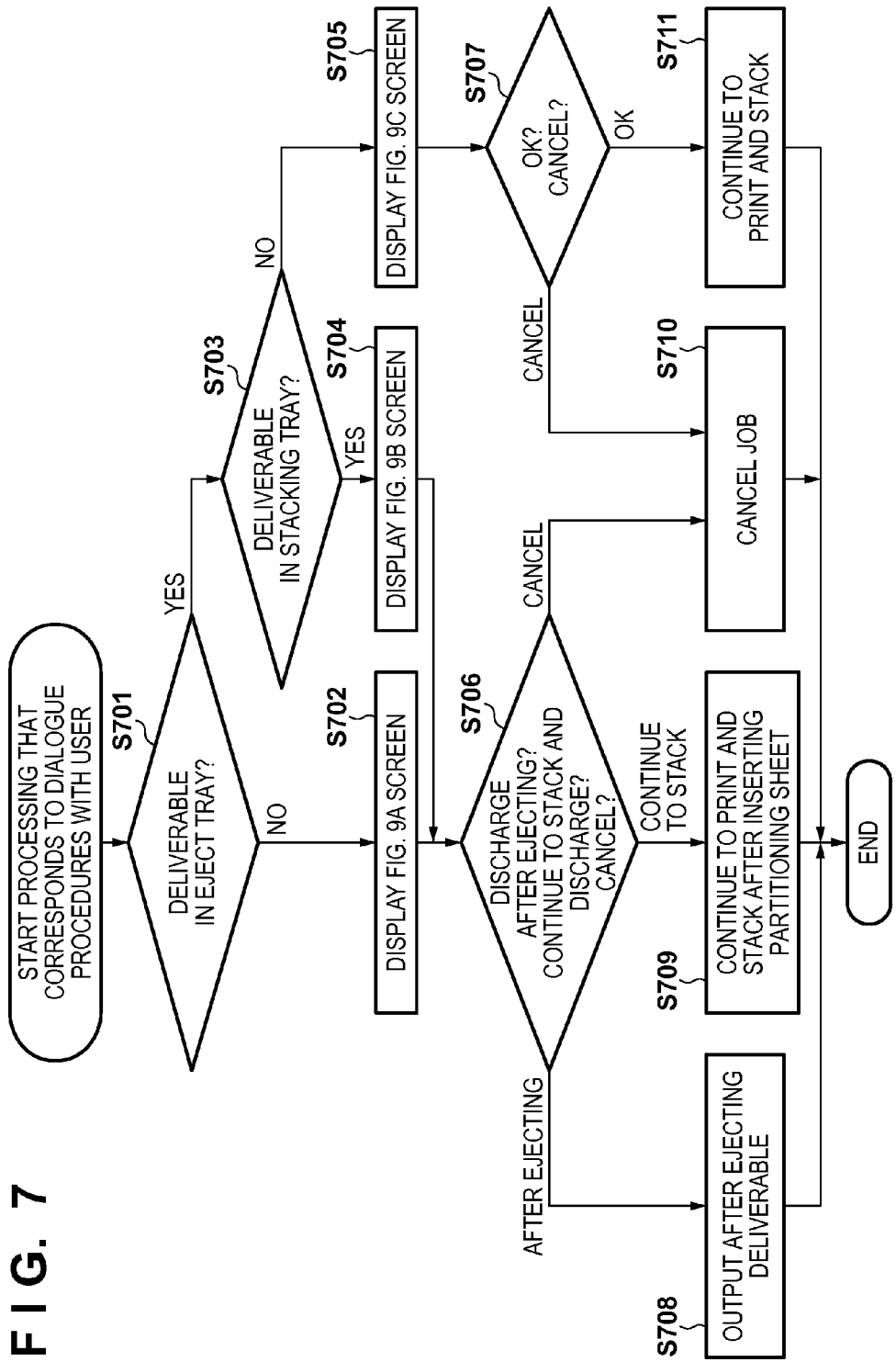
FIG. 7 is another flowchart showing stacker sheet discharge control.

Next, a discharge control operation in a case in which a job print instruction was given by the user via the screen in FIG. 4 in the PC 102 will be described with reference to FIG. 6 and FIG. 7. Note that programs that realize processing according to these flowcharts are, for example, stored in the ROM 207, and appropriately loaded to and executed by the control unit 205. First, in FIG. 6, the control unit 205 receives a job and a job execution instruction (step S601). Here, a print instruction from the user given via the screen in FIG. 4 is conveyed to the control unit 205 via the network 101 and the external I/F 202. Next, the control unit 205 determines whether or not the sheet discharge destination setting of the job, for which a print instruction has been received, designates the stacker unit (stacking tray 502) of the stacker (step S602). If it is determined in step S602 that it is not a job designating the stacker unit of the stacker, the control unit 205 starts print processing, and performs control so that sheets are discharged to the sheet discharge destination designated in the job (step S603). However, if it is determined in step S602 that the stacker unit of the stacker is designated, the control unit 205 obtains stacking information regarding the eject tray 508 of the stacker and the stacking tray 502 from the device information monitoring unit 211. Then, the control unit 205 determines whether or not at least one between the eject tray 508 and the stacking tray 502 is in a state in which deliverables are already stacked (step S604). In the case in which it is determined in step S604 that there is no deliverable stacked on either tray, the control unit 205 starts print processing, and performs control such that sheets are discharged to the sheet discharge destination designated in the job (step S603). In other words, in this case, control is performed such that sheets are discharged to the stacker unit 501 of the stacker.

However, in the case in which it is determined in step S604 that deliverables are already stacked on at least one of the trays, the control unit 205 obtains the printing degree of priority designated in the job. Then, it is determined whether or not the degree of priority is higher than the degree of priority of the already stacked deliverables (in other words, the job for which printing has already started) (step S605). In the case in which it is determined in step S605 that the degree of priority designated in the job is lower than or equal to that of the already stacked deliverables, the control unit 205 starts print processing, and performs control such that sheets are discharged to the sheet discharge destination designated in the job (step S603). In other words, regarding this case as well, control is performed such that sheets are discharged to the stacker unit 501 of the stacker. On the other hand, in the case in which it is determined in step S605 that the degree of priority designated in the job is higher, the control unit 205 performs control so that a dialogue procedure with the user (described later) about processing according to the printing of the corresponding job is performed, discharge operations are put on stand-by, and the desired processing content is determined (step S606).

Figure 9A:
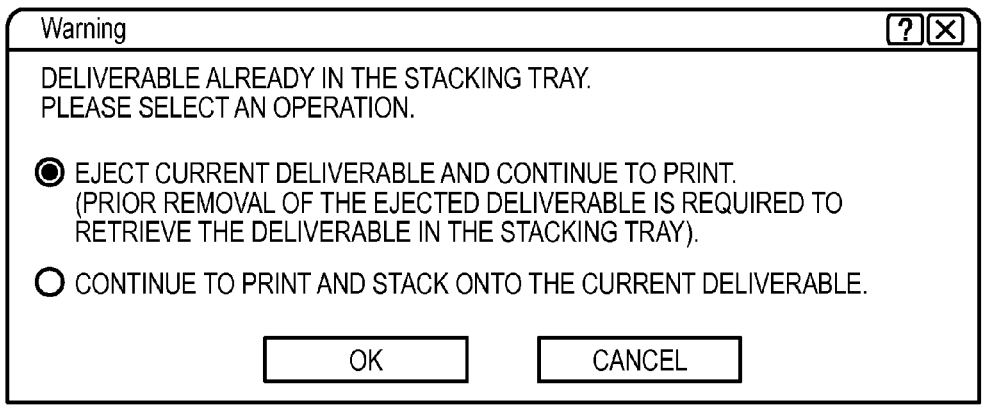
FIGS. 9A to 9C are diagrams showing a screen that is displayed when the stacker performs sheet discharge control.

Next, details of the processing in step S606 will be described with reference to FIG. 7. First, the control unit 205 obtains stacking information regarding the eject tray 508 from the device information monitoring unit 211, and determines whether or not there are already deliverables (step S701). In the case in which it is determined in step S701 that there are no deliverables in the eject tray 508, the control unit 205 performs control so that the screen in FIG. 9A is displayed on the screen in FIG. 4 (step S702). Here, in step S604 it has been determined that there are already deliverables in one of the trays, and therefore in the case in which "No" is determined in step S701, it means that the stacking tray 502 is in a state of having stacked deliverables.

In the case in which only the stacking tray 502 is in a state of having stacked deliverables and the printing of a job with a high degree of priority is to be performed, there are two options available to the user other than canceling the job. One option is to print and stack the other job onto the stacking tray 502 after discharging the deliverables already in the stacking tray 502 to the eject tray 508 to avoid the mixed stacking of jobs. Also, another option is to continue to print and stack the job onto the deliverables already in the stacking tray 502. However, in the case of the former processing being performed, in order to retrieve the deliverables of the job with a high degree of priority, the need to remove the bundle discharged to the eject tray 508 arises, and thus there is a need to convey this to the user and obtain the user's consent. In view of this, a screen such as the one in FIG. 9A is displayed, and upon conveying content that requires attention, the user chooses a desired operation from the above three operations including cancelation (step S706). Note that in the case in which the option to continue to print and stack the job onto the deliverables already stacked in the stacking tray 502 is selected, control may be performed to make a distinction between deliverables, such as inserting a partitioning sheet or performing a shift operation.

Figure 9B:
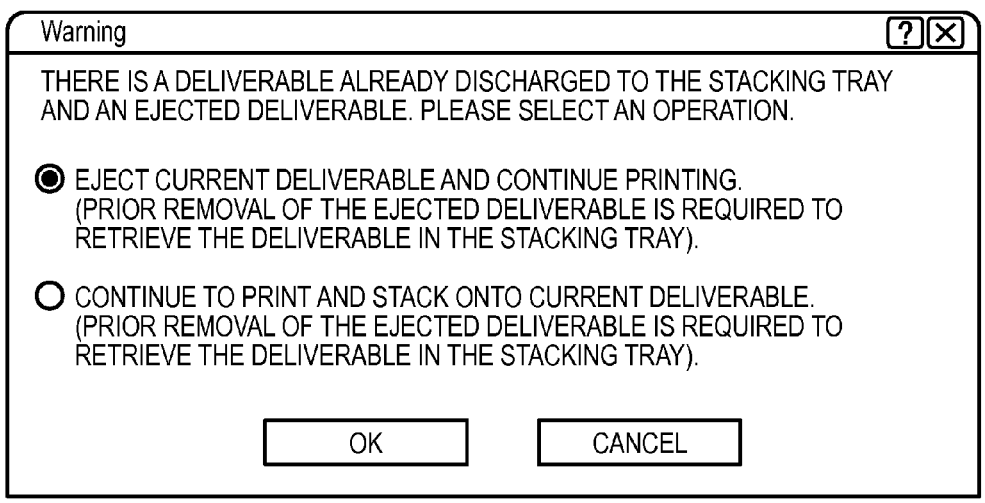

On the other hand, in the case in which it is determined in step S701 that there are deliverables in the eject tray 508, the control unit 205 obtains stacking information regarding the stacking tray 502 from the device information monitoring unit 211, and determines whether or not there are already deliverables (step S703). In the case in which it is determined in step S703 that there are deliverables in the stacking tray 502, the control unit 205 performs control such that the screen in FIG. 9B is displayed on the screen in FIG. 4 (step S704). Also regarding the case in which printing of a job with a high degree of priority is to be performed in a state in which there are deliverables in both the stacking tray 502 and the eject tray 508, two options other than canceling the job are available to the user similarly to the case in step S702. Specifically, either the deliverables already in the stacking tray 502 are discharged to the eject tray 508 and then a job is printed and stacked onto the stacking tray 502, or the job continues to be stacked as is. However, unlike step S702, even in the case in which the latter processing is selected, in order to retrieve the deliverables of the job with a high degree of priority, the need to remove the bundle discharged to the eject tray 508 arises, and thus there is a need to convey this to the user and obtain the user's consent. In view of this, a screen such as the one in FIG. 9B is displayed, and upon conveying content that requires attention, the user chooses a desired operation from the above three options including cancelation (step S706). Note that in regards to this as well, as described above, in the case in which a selection is made to continue to print and stack a job onto the deliverables that are already in the stacking tray 502, control may be performed so as to make a distinction between the deliverables.

Figure 9C:
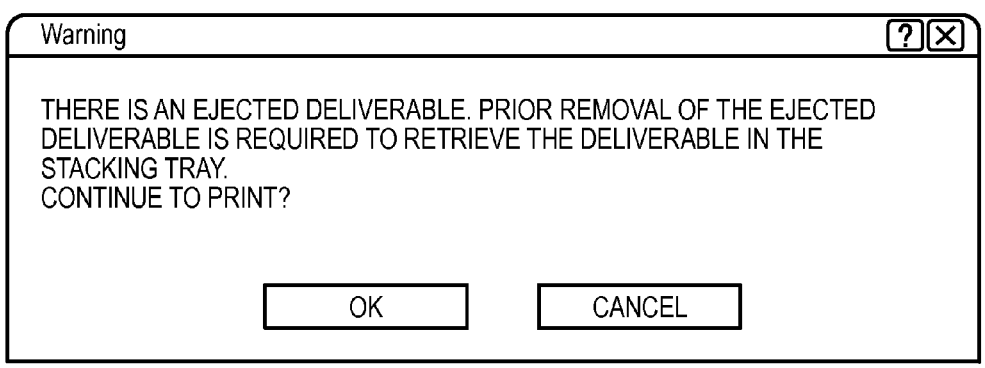

However, in the case in which it is determined in step S703 that there are no deliverables in the stacking tray 502, the control unit 205 performs control such that the screen in FIG. 9C is displayed on the screen in FIG. 4 (step S705). In the case in which printing of a job with a high degree of priority is to be performed in a state in which there are deliverables in only the eject tray 508, the user can select between canceling the job or performing stacking onto the empty stacking tray 502 as is. However, in the case in which stacking onto the stacking tray 502 is to be performed as is, in order to retrieve the deliverables of the job with a high degree of priority, the need to remove the bundles that have already been discharged to the eject tray 508 arises, and therefore there is a need to convey this to the user and obtain the user's consent. In view of this, the control unit 205 displays a screen similar to that of FIG. 9C, and after the content that requires attention has been conveyed to the user, the user selects between performing stacking onto the stacking tray 502 as is, or canceling the job (step S707).

The following describes the case in which the user selects the operation "discharge the deliverables already in the stacking tray 502 to the eject tray 508, and then print and stack the job on the stacking tray 502" in either FIG. 9A or FIG. 9B. In other words, this is the case in which the control unit 205 has determined in step S706 that the above selection has been made by the user. In this case, the control unit 205 instructs the stacker 500 such that the deliverables stacked in the stacking tray 502 are shifted to the eject tray 508 and discharged to the outside of the stacker. Then, the control unit 205 completes the instructed processing of discharge to the outside of the stacker, and starts printing the received job and performs stacking of the deliverable to the stacking tray 502 after the stacking tray 502 has returned to the start stack position (step S708). Note that in the processing in step S708, in the case in which deliverables are also already stacked in the eject tray 508, the control unit 205 waits until the deliverables stacked in the eject tray 508 are removed, and then gives an instruction to discharge the deliverables in the stacking tray 502. For this reason, printing of the received job does not start until the deliverables stacked in the eject tray 508 are removed.

On the other hand, in the case in which the user has selected "cancel" in FIG. 9A or FIG. 9B, in other words, in the case in which the control unit 205 determined in step S706 that cancelation has been selected by the user, the control unit 205 cancels the execution of the received job (step S710). Also, in the case in which the user has selected "cancel" in FIG. 9C, the control unit 205 cancels the execution of the received job (step S710), similarly to the case in which the control unit 205 determined in step S707 that cancel has been selected by the user.

Next, the case in which the user selected the operation "continue to stack and print onto the current deliverables" in FIG. 9A or FIG. 9B will be described. In other words, this is a case in which the control unit 205 determined in step S706 that the above selection was made by the user. In this case, the control unit 205 inserts one partitioning sheet so that separation from the already stacked deliverable is discernible, and then starts the printing of the received job and performs stacking of the deliverable to the stacking tray 502 after (step S709). Note that here, a method in which a partitioning sheet is used has been described as a method of easily discerning the separation with the already stacked deliverables, but a method in which a shift operation is used may be used as another method.

The following describes the case in which the user has pressed "OK" in step 9C, in other words, the case in which the control unit 205 determined in step S707 that "OK" was selected by the user. In this case, the control unit 205 starts the printing of the received job and performs stacking of the deliverable to the stacking tray 502 without inserting a partitioning sheet (step S711).

Second Embodiment

The following describes different control regarding the case in which the user selected the operation "discharge the deliverables already in the stacking tray 502 to the eject tray 508, and then print and stack the job onto the stacking tray 502" in either FIG. 9A or FIG. 9B. In other words, this is the case in which the control unit 205 has determined in step S706 that the above selection was made by the user. In this case, first the control unit 205 instructs the stacker to shift the deliverables stacked in the stacking tray 502 to the eject tray 508, and then discharge them to the outside of the stacker. Then, as printing and stacking onto the stacking tray 502 starts, the control unit 205 completes the instructed processing of discharge to the outside of the stacker, and waits until the stacking tray 502 has returned to the start stack position. The control unit 205 is configured so as to further wait for the removal of the deliverables that have been discharged to the outside of the stacker at this time. In this case, the control unit 205 performs control so that a screen similar to that of FIG. 10 is displayed on the screen in FIG. 4 instead of that in FIG. 9A, and allows the user to select whether or not to "Start printing after removing deliverables discharged to the outside of the stacker". Then, in the case in which the user selected the option "Start printing after removing deliverables", the control unit 205 performs control as described above to start printing and stacking to the stacking tray 502 after waiting for the deliverables discharged to the outside of the stacker to be removed. In this case, the control unit 205 may detect that the deliverables have been discharged to the outside of the stacker based on a signal from a sensor or the like that detects the presence or absence of sheets and is provided on the eject tray 508.

By performing such control, in a state in which deliverables are stacked on the eject tray 508, a state arises in which stacking of the job to the stacking tray 502 cannot start. For this reason, it is possible to reliably avoid falling into a state in which the deliverables stacked in the stacking tray 502 are to be retrieved from first, but cannot be retrieved because of the deliverables in the eject tray 508. Here, even in interruption printing, printing cannot start as long as there are deliverables that have been discharged to the outside of the stacker, but as shown in FIG. 10 in the present embodiment, the user can make a selection with the check button, and therefore appropriate use according to the situation is possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-167955, filed Aug. 20, 2014, which is hereby incorporated by reference herein in its entirety.

What is claimed is:

1. A printing apparatus comprising:
an image forming unit configured to form an image on a sheet based on a print job;
a plurality of stacking units on each of which the sheet of the print job is stacked, the plurality of stacking units including a first stacking unit and a second stacking unit;
a display unit; and
a controller configured to:
receive the print job,
determine whether or not the print job is an interruption print job,
in a case where the print job is received while the second stacking unit has been slid to a sheet retrieving position outside the printing apparatus and the print job is determined to be the interruption print job, restrict an operation of discharge to the first stacking unit and cause the display unit to display a warning screen, and control the image forming unit to start forming the image on the sheet to release the restricted operation of discharge to the first stacking unit in response to a user instruction accepted via the displayed warning screen, and
in a case where the print job is received while the second stacking unit has been slid to the sheet retrieving position and the print job is determined not to be the interruption print job, control the image forming unit to start forming the image on the sheet based on the print job and to discharge the sheet to the first stacking unit without displaying the warning screen.

2. The printing apparatus according to claim 1, wherein the warning screen includes a continue button and a cancel button, forming an image is started based on the print job according to a selection of the continue button, and the print job is canceled according to a selection of the cancel button.

3. The printing apparatus according to claim 1, wherein, in a case where sheets are stacked on the first stacking unit when executing the interruption print job, the controller controls the display unit to display a screen for receiving a selection of whether to retrieve a sheet stacked on the first stacking unit.

4. The printing apparatus according to claim 1, wherein the warning screen is a screen which warns that a sheet stacked on the second stacking unit needs to be retrieved first in order to retrieve sheets of the interruption print job.

5. The printing apparatus according to claim 1, wherein the warning screen is a screen which prompts removal of a sheet stacked on the second stacking unit.

6. The printing apparatus according to claim 1 wherein the warning screen is not displayed, in a case where the second stacking unit is not slid to the sheet retrieving position.

7. The printing apparatus according to claim 6, wherein the controller controls the display unit to display a second warning screen, in a case where the second stacking unit is not slid to the sheet retrieving position and a sheet is stacked on the first sacking unit.

8. The printing apparatus according to claim 1, wherein the second stacking unit is slid to the sheet retrieving position from a sheet stacking position inside the printing apparatus, in a case where a predetermined stacking condition is met.

9. The printing apparatus according to claim 1, wherein the interruption print job is a print job which interrupts another print job.

10. The printing apparatus according to claim 1, wherein the interruption print job is a job which has a higher priority than that of a job which has already been executed.

11. The printing apparatus according to claim 1, wherein the first stacking unit and the second stacking unit are shaped to fit with each other, and are configured in such a way that interplay is possible.

12. The printing apparatus according to claim 1, wherein the first stacking unit is configured to move vertically, and the second stacking unit is configured to move forward and backward.

13. The printing apparatus according to claim 1, wherein the first stacking unit descends to a position lower than the second stacking unit, sheets stacked on the first stacking unit are moved on the second stacking unit, the second stacking unit slides to the sheet retrieving position outside the printing apparatus to discharge the sheets, and the first stacking unit ascends to a start position to resume loading of sheets.

14. A control method executed in a printing apparatus including a display unit, an image forming unit configured to form an image on a sheet based on a print job, and a plurality of stacking units on each of which the sheet of the print job is stacked, the plurality of stacking units including a first stacking unit and a second stacking unit, the control method comprising:

receiving the print job;

determining whether or not the print job is an interruption print job;

in a case where the received print job is received while the second stacking unit has been slid to a sheet retrieving position outside the printing apparatus and the print job is determined to be the interruption print job, restricting an operation of discharge to the first stacking unit and causing the display unit to display a warning screen, and controlling the image forming unit to start forming the image on the sheet to release the restricted operation of discharge to the first stacking unit in response to a user instruction accepted via the displayed warning screen; and in a case where the print job is received while the second stacking unit has been slid to the sheet retrieving position and the print job is determined not to be the interruption print job, controlling the image forming unit to start forming the image on the sheet based on the print job and to discharge the sheet to the first stacking unit without displaying the warning screen.

* * * * *